United States Patent
Asada

[11] 3,878,716
[45] Apr. 22, 1975

[54] KARMAN VORTEX SHEDDER

[75] Inventor: Yasuo Asada, Tokyo, Japan

[73] Assignee: Hokushin Electric Works, Ltd., Tokyo, Japan

[22] Filed: Dec. 19, 1973

[21] Appl. No.: 426,315

[52] U.S. Cl. .............................................. 73/194 B
[51] Int. Cl. ............................ G01f 1/00; G01p 5/00
[58] Field of Search ........................... 73/194 B, 228

[56] References Cited
UNITED STATES PATENTS

| | | | |
|---|---|---|---|
| 1,215,135 | 2/1917 | Fisher | 73/194 |
| 1,935,445 | 11/1933 | Heinz | 73/194 |
| 2,813,424 | 11/1957 | Liepmann et al. | 73/194 |
| 3,116,639 | 1/1964 | Bird | 73/194 |

Primary Examiner—Herbert Goldstein

[57] ABSTRACT

A low-cost flowmeter having a vortex shedder mounted across a conduit through which flows the fluid whose rate is to be measured. Established in the conduit is a magnetic field whose lines of flux are parallel to the direction of flow. These lines are cut by a sensor in the form of a conductor mounted behind the shedder, the conductor vibrating at right angles to the magnetic field in response to fluidic oscillations produced by the shedder as a result of Karman vortices. The frequency of the signal induced in the vibrating conductor is proportional to the flow rate or flow velocity of the fluid.

5 Claims, 9 Drawing Figures

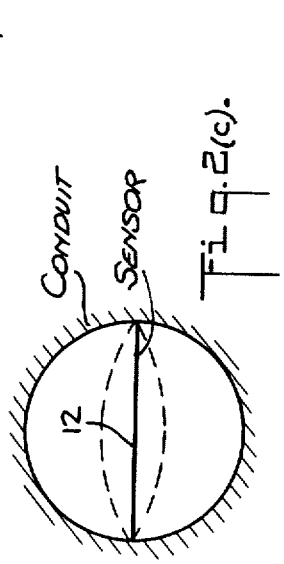
Fig. 1(b).
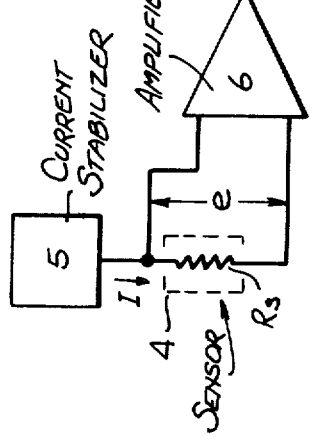
Fig. 2(c).
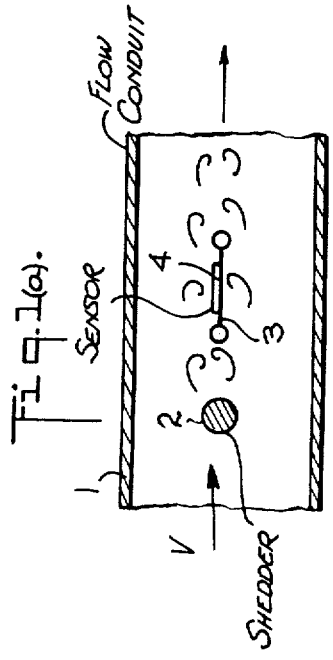
Fig. 1(a).
Fig. 2(b).
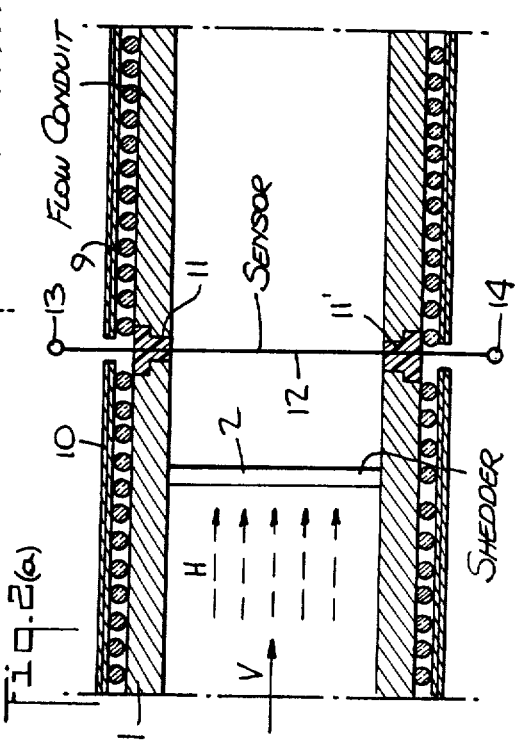
Fig. 2(d).
Fig. 2(a).

3,878,716

KARMAN VORTEX SHEDDER

BACKGROUND OF THE INVENTION

This invention relates generally to the measurement of fluid flow rate, and more particularly to a Karman vortex flowmeter which detects the frequency of fluidic oscillations produced behind a shedder disposed in a flow conduit.

It is well known that under certain circumstances, the presence of a vortex shedder in a flow conduit will give rise to periodic Karman vortices. The number of Karman vortices produced per unit of time (the frequency of the Karman vortices), is a function of the flow velocity or flow rate of the fluid flowing through the conduit. Thus the flow velocity or flow rate of the fluid can be obtained by measuring the frequency of the Karman vortices.

In one known form of vortex flowmeter, a rod-type shedder is disposed in a flow conduit transversely with respect to the direction of flow therein. Placed behind the shedder is an oscillation plate having a strain gauge sensor thereon to detect fluidic oscillations caused by pressure variations of the fluid due to periodic Karman vortices.

The construction of the sensor in this known type of vortex flowmeter is complicated and gives rise to a large pressure drop in the conduit. Moreover, this sensor must be included in a relatively complicated electrical circuit to obtain a pulse signal having a frequency proportional to the flow rate.

SUMMARY OF THE INVENTION

In view of the foregoing, it is the main object of the invention to provide a low-cost vortex flowmeter employing a sensor of simple construction operating in conjunction with an uncomplicated pulse output circuit capable of obtaining the pulse signal directly from the sensor. A significant advantage of a flowmeter in accordance with the invention is that it gives rise to a relatively low pressure drop.

Briefly stated, this object is attained by a flowmeter including a sensor, for example an electroconductive wire, mounted transversely with respect to the axis of a conduit and behind the shedder disposed in the flow conduit. Means are provided to establish an electromagnetic field parallel to the axis of the conduit and therefore parallel to the direction of the fluid flow, the magnetic field being established in the region where the sensor is placed. The frequency of fluidic oscillations produced behind the shedder is detected by the sensor to develop a signal across the terminals of the wire.

OUTLINE OF THE DRAWINGS

For a better understanding of the invention as well as other objects and further features thereof, reference is made to the following detailed description to be read in conjunction with the accompanying drawings, wherein:

FIG. 1 (a) is a longitudinal cross section of a prior art flowmeter,

FIG. 1 (b) is a schematic diagram of the electrical circuit of the flowmeter shown in FIG. 1 (a).

FIG. 2 (a) is a cross section of a first referred embodiment of a flowmeter according to the present invention, the section being taken parallel to a vortex shedder and to fluid flow in the conduit.

FIG. 2 (b) is a cross section of the conduit shown in FIG. 2 (a), taken across the vortex shedder.

FIG. 2 (c) is a cross section of the conduit shown in FIG. 2 (b), viewing a sensor from the upper stream side.

FIG. 2 (d) is a schematic diagram of the electrical circuit of the flowmeter shown in FIGS. 2 (a), (b), (c).

FIG. 4 (b) is a cross section of the conduit shown in FIG. 4 (a), taken across the axis of the vibrating plate.

DESCRIPTION OF THE INVENTION

Prior Art

Figure 3:
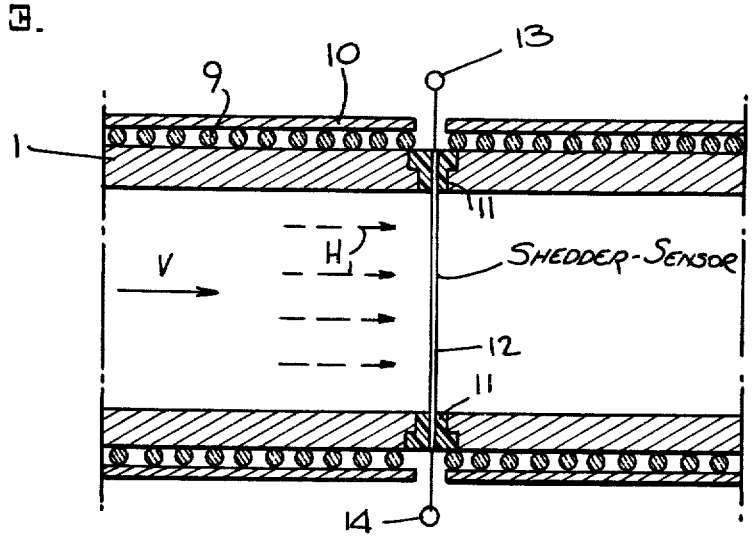
FIG. 3 is a cross section of a second embodiment of this invention in which the vortex shedder also acts as a sensor.

Referring now to FIG. 1 (a) there is shown a known type of Karman vortex flowmeter having a rod-type shedder 2 disposed at right angles to the direction of fluid flow V in a flow conduit 1. The meter is provided with an oscillation plate 3 having a strain gauge sensor 4 mounted thereon at a position behind shedder 2 parallel to the direction of fluid flow V. The sensor acts to detect fluidic oscillations caused by pressure variations of the fluid due to periodic Karman vortices F.

This conventional arrangement is relatively complicated and causes a relatively large pressure drop in flow conduit 1. In order to obtain a pulse signal having a frequency proportional to flow rate, it is necessary, as shown in FIG. 1(b), to include a sensor 4 in a relatively complex circuit. It will be seen that a current I is conducted through strain gauge sensor 4 by means of a current-stabilizing circuit 5, the resistance of the gauge being represented by value $R_s$. Variations in the value of this resistance caused by fluidic oscillations are converted into a voltage signal e which is amplified in amplifier 6 and applied to a wave-shaper 7 to produce at output terminal 8 the pulse signal $e_p$.

First Embodiment

Referring now to FIGS. 2 (a), (b), (c), there is shown a preferred embodiment of a Karman vortex flowmeter in accordance with the invention, the meter including a vortex shedder 2 of the rod type and a sensor in the form of a conductive wire 12.

Shedder 2 is mounted transversely with respect to a conduit 1 which is formed of non-magnetic metal. The fluid V to be measured flows through the conduit in a direction normal to the shedder and sensor. As shown in FIG. 2 (b), Karman vortices F are generated behind shedder 2 in the usual manner. The conductive sensor 12 of the wire type is supported at either end at a position behind shedder 2 by insulating bushings 11, 11' inserted in the wall of conduit 1, the wire thereby being exposed to the fluid V.

The ends of sensor 12 are connected electrically to output terminals 13 and 14. An exciting coil 9 is wound about the periphery of conduit 1 to generate an electromagnetic field H whose lines of the flux are parallel to the axis of the conduit and therefore parallel to the direction of the fluid flow. Exciting coil 9 is covered with a core 10 forming a return path for the magnetic flux of the magnetic field H.

FIG. 2 (d) shows the schematic diagram of the electrical circuit of the meter according to the present invention. Current Io is applied to exciting coil 9 from a suitable D. C. source 18. The resultant voltage signal e generated across terminals 13 and 14 of sensor 12 is applied to a waveform-shaper 7 to yield at terminal 8 the pulse output signal ep.

In this arrangement, when fluid V flows through conduit 1, Karman vortices F are generated behind the shedder 2. Because of the Karman vortices F, the pressure distribution of the fluid V near the sensor 12 is varied periodically and the sensor 12 is caused to vibrate perpendicularly both to the direction of the axis of the conduit 1 and to the lines of the magnetic flux of the magnetic field H, as shown by an arrow in FIG. 2 (b).

As a consequence of this vibration, sensor 12 which is an electrically conductive wire, sweeps the area defined by So as shown by oblique lines in FIG. 2 (c), so as to cut the magnetic flux of the magnetic field H applied parallel to the direction of the fluid flow V. As a result, an alternating voltage is induced in the wire to produce signal e across the terminals 13 and 14. The following equation is applicable to the sensor operation:

$$e = K_1 . \mu . H . F(f) = K_1 . B . F(f) \qquad (1)$$

or $$F = \frac{1}{K_1 . B} . F^{-1}(e) \qquad (1)$$

where: $K_1$ is a constant; f is the frequency of vibration of the sensor; $F(f)$ is a function of $f$; $F^{-1}(e)$ is the reciprocal function of $e$; $\mu$ is the magnetic permeability of fluid V; H is the intensity of the magnetic field; B is the flux density.

On the other hand, the following equation can be obtained between the mean flow velocity v and frequency f, and between the mean flow velocity v and flow rate Q of the fluid V:

$$f = K_2 . v \qquad (2)$$

$$Q = K_3 . S . v \qquad (3)$$

where: $K_2, K_3$ are constants S is the cross sectional area of the conduit 1.

Then, the following equation for the flow rate Q of the fluid V can be obtained from the equations (1), (2) and (3).

$$Q = \frac{K_3 . S}{K_1 . K_2 . B} . F^{-1}(e) \qquad (4)$$

Accordingly, when the diameter of the conduit 1, the diameter of the sensor 1 and the character of the fluid V are given, flow rate Q of the fluid V can be obtained from the following equation:

$$Q = k . F^{-1}(e) = k' . F(f) \qquad (5)$$

That is to say, flow rate Q of the fluid V flowing through the conduit 1 can be measured by detecting the frequency $f$ of the alternating voltage signal $e$.

It is apparent from the foregoing description, that the flowmeter in accordance with the present invention has a relatively simple structure particularly with respect to the construction of the sensor, and that it can yield an electrical signal corresponding to the flow rate directly from the sensor. Hence the flowmeter has advantageous features which are lacking in a conventional flowmeter. Among these features are the following:

a. Because the sensor is simple and sensitive, the flowmeter can be used for the measurement of the flow rate and flow velocity of both liquid and gas. And because of the simple construction of the sensor, a flowmeter for measuring corrosive fluid may readily be manufactured.

b. Because of its simple and economical construction, the invention is applicable to a flowmeter of large diameter as well as to one of small diameter.

c. The flowmeter may be maintained without difficulty.

d. Pressure drop due to the presence of the sensor is very small.

e. Because the output signal corresponding to the flow rate can be detected directly from the sensor, the electrical circuit for the output signal can be made simple and economically.

Second Embodiment

A second embodiment according to the present invention shall now be explained in connection with FIG. 3. In the flowmeter as shown in FIG. 3, a shedder is omitted, the sensor 12 also functioning as a shedder. That is, when the flow rate becomes large, Karman vortices are generated just behind the sensor, so it can be detected by the sensor itself. Thus the flowmeter shown in FIG. 3 can be used for measuring a fluid of high velocity and its construction can be made even simpler than the flowmeter shown in FIG. 2.

Third Embodiment

Figure 4A:
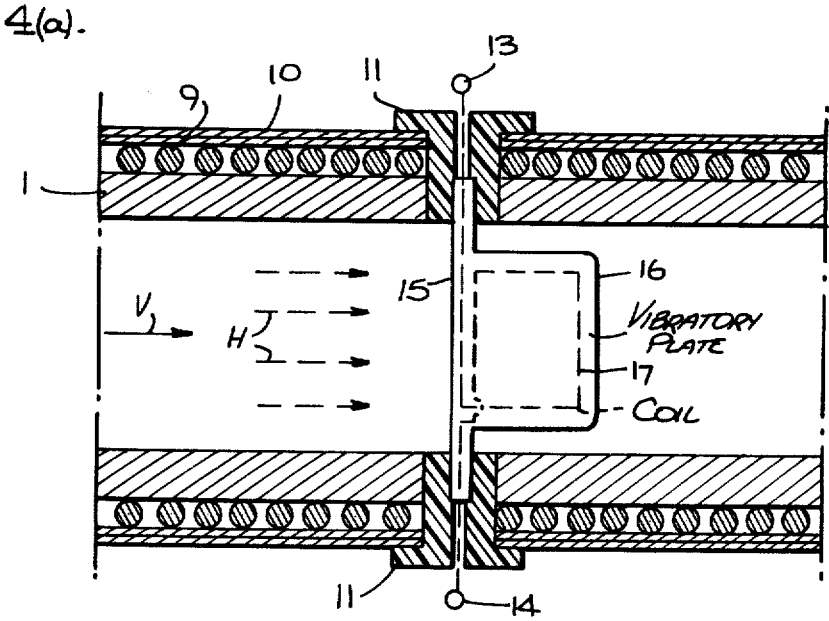
FIG. 4 (a) is a cross section of a third embodiment of this invention, taken parallel to the axis of the vibrating plate.
Figure 4B:
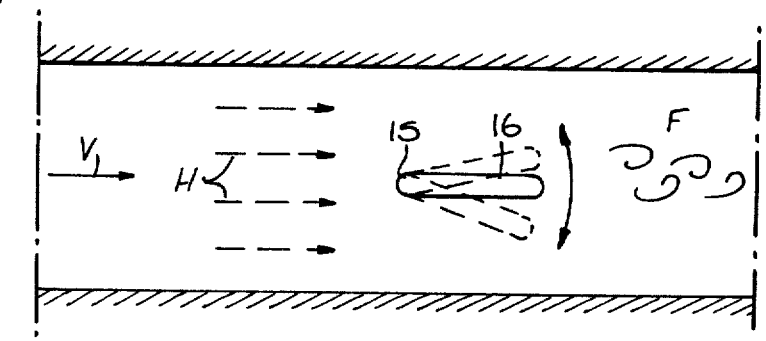

The third embodiment according to the present invention is shown in FIGS. 4 (a) and 4 (b). In these figures, a shaft 15 is rotatably supported in the conduit by insulating bushings 11,11' in the wall of the conduit 1, the shaft being equipped with a plate 16 formed of nonmagnetic material. A lead wire 17 (shown by dotted lines) wound in the form of a coil, is arranged within the plate 16 to serve as a sensor, the ends of the lead wire being connected to the terminals 13 and 14 respectively.

When fluid V flows through the conduit 1, the plate 16 periodically oscillates around the shaft 15 at a rate corresponding to the frequency of the Karman vortices. As a consequence, the coil-shaped sensor in plate 16 cuts the magnetic flux of the magnetic field H and an electromotive force is generated across terminals 13 and 14.

The significant feature of this embodiment is that the number of lines of magnetic flux cut by the sensor may be made larger than that of the embodiment shown in FIG. 2 or in FIG. 3. The coil turns of the sensor may be increased as one chooses, to obtain a highly accurate flowmeter.

Modifications

In FIGS. 2, 3 and 4, the magnetic field H established within the conduit 1 is a D-C field. It is alternatively possible to make use of an A-C current to establish an A-C field, but in this instance the frequency of the A-C field must be outside of the frequency range of the frequency of the output signal to avoid interference therebetween.

While there have been shown preferred embodiments of the invention, it will be appreciated that many changes may be made therein without, however, departing from the essential spirit of the invention as disclosed herein.

I claim:

1. A Karman vortex flowmeter comprising:
   A. a flow conduit forming a passage for the fluid to be measured,
   B. a vortex shedder mounted in said conduit transversely with respect to the direction of fluid flow, to produce fluidic oscillations whose frequency is a function of flow rate,
   C. means to establish a magnetic field within said conduit whose lines of flux are parallel to said direction of flow,
   D. wire means supported for vibration in said conduit and physically responsive to said oscillations whereby said means are caused to vibrate in a direction intersecting said lines of flux to induce a signal therein whose frequency is a function of flow rate, and
   E. means coupled to said wire means and responsive to the frequency of said signal to indicate flow rate.

2. A flowmeter as set forth in claim 1, wherein said wire means is constituted by a single wire extending transversely with respect to the direction of fluid flow.

3. A Karman vortex flowmeter as set forth in claim 2, wherein said wire means also functions as the shedder.

4. A Karman vortex flowmeter as set forth in claim 1, wherein said wire means in the form of a coil and said shedder is constituted by a shaft rotatably supported in said flow conduit and having a non-magnetic plate extending therefrom in which is incorporated said wire means wherein an electromotive force is generated as a result of the oscillation of said plate in response to said fluidic oscillations to produce said signal.

5. A flowmeter as set forth in claim 1, further including a wave shaper coupled to said wire means to produce output pulses in response to said signal at a rate which is a function of flow rate.

* * * * *